(12) United States Patent
Mossman et al.

(10) Patent No.: US 9,872,436 B2
(45) Date of Patent: Jan. 23, 2018

(54) DRUM CONVEYOR

(71) Applicant: Deere & Company, Moline, IL (US)

(72) Inventors: Michael W. Mossman, Silvis, IL (US); Duane J. Gosa, Colona, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/145,067

(22) Filed: May 3, 2016

(65) Prior Publication Data

US 2017/0318746 A1    Nov. 9, 2017

(51) Int. Cl.
*A01D 34/00* (2006.01)
*A01D 61/00* (2006.01)
*A01D 34/04* (2006.01)
*A01D 41/02* (2006.01)
*A01D 61/02* (2006.01)

(52) U.S. Cl.
CPC ......... *A01D 61/008* (2013.01); *A01D 34/04* (2013.01); *A01D 41/02* (2013.01); *A01D 61/02* (2013.01)

(58) Field of Classification Search
CPC .. A01D 61/008; A01D 89/002; A01D 89/001; A01D 89/00
See application file for complete search history.

(56) References Cited

U.S. PATENT DOCUMENTS

| | | | | | |
|---|---|---|---|---|---|
| 2,133,143 A | * | 10/1938 | Innes | ................... | A01D 89/002 198/518 |
| 2,165,088 A | * | 7/1939 | Anderson | ............ | A01D 89/002 56/364 |
| 2,286,095 A | * | 6/1942 | Innes | ................... | A01D 89/002 56/364 |
| 2,455,905 A | * | 12/1948 | Ronning | ............. | A01D 61/008 198/513 |
| 2,529,180 A | * | 11/1950 | Oehler | ................. | A01D 61/008 180/21 |
| 2,617,518 A | * | 11/1952 | Anderson | ............. | A01D 89/00 198/692 |
| 2,633,231 A | * | 3/1953 | Pilcher | ................. | A01D 61/008 198/613 |
| 2,644,284 A | * | 7/1953 | Oberholtz | ............. | A01D 41/02 56/14.6 |
| 2,644,292 A | * | 7/1953 | Oberholtz | ........... | A01D 89/002 56/14.5 |
| 2,696,290 A | * | 12/1954 | Carroll | ................. | A01D 61/008 198/720 |
| 2,701,634 A | * | 2/1955 | Carroll | ................. | A01D 61/008 198/518 |
| 3,142,375 A | * | 7/1964 | Luke | .................... | A01D 61/008 198/613 |
| 3,358,429 A | * | 12/1967 | Claas | .................... | A01D 57/12 56/12.4 |
| 3,411,615 A | * | 11/1968 | Schwalm | ............. | A01D 89/002 198/518 |
| 4,178,942 A | * | 12/1979 | Nusser | .................. | A01F 12/442 460/80 |

(Continued)

*Primary Examiner* — Arpad Fabian-Kovacs

(74) *Attorney, Agent, or Firm* — Rathe Lindenbaum LLP

(57) ABSTRACT

A drum conveyor has a laterally extending drum (120), first and second stub axles (204, 206) extending into the ends of the drum; two link members (208, 210) that are fixed to the stub axles inside the drum and that support a third axle (212) inside the drum for free rotation with respect to the two link members.

20 Claims, 5 Drawing Sheets

(56) References Cited

U.S. PATENT DOCUMENTS

| | | | | |
|---|---|---|---|---|
| 4,271,956 | A * | 6/1981 | Hutchinson | B65G 65/22 |
| | | | | 198/613 |
| 4,408,618 | A * | 10/1983 | Witzel | A01F 7/06 |
| | | | | 460/80 |
| 4,453,375 | A * | 6/1984 | Field | A01D 89/002 |
| | | | | 56/14.6 |
| 4,574,815 | A * | 3/1986 | West | A01F 12/442 |
| | | | | 460/80 |
| 5,768,868 | A * | 6/1998 | Stein | A01D 57/04 |
| | | | | 56/14.5 |
| 6,158,571 | A * | 12/2000 | Gosa | A01D 61/008 |
| | | | | 198/613 |
| 6,244,955 | B1 * | 6/2001 | Bischoff | A01D 61/008 |
| | | | | 460/114 |
| 2005/0284124 | A1 * | 12/2005 | Patterson | A01D 61/008 |
| | | | | 56/364 |
| 2006/0252472 | A1 | 11/2006 | Lanzinger | |
| 2009/0056298 | A1 * | 3/2009 | Lohrentz | A01D 41/14 |
| | | | | 56/364 |
| 2011/0061354 | A1 | 3/2011 | Batu | |
| 2014/0237978 | A1 * | 8/2014 | Washburn | A01D 61/006 |
| | | | | 56/181 |

\* cited by examiner

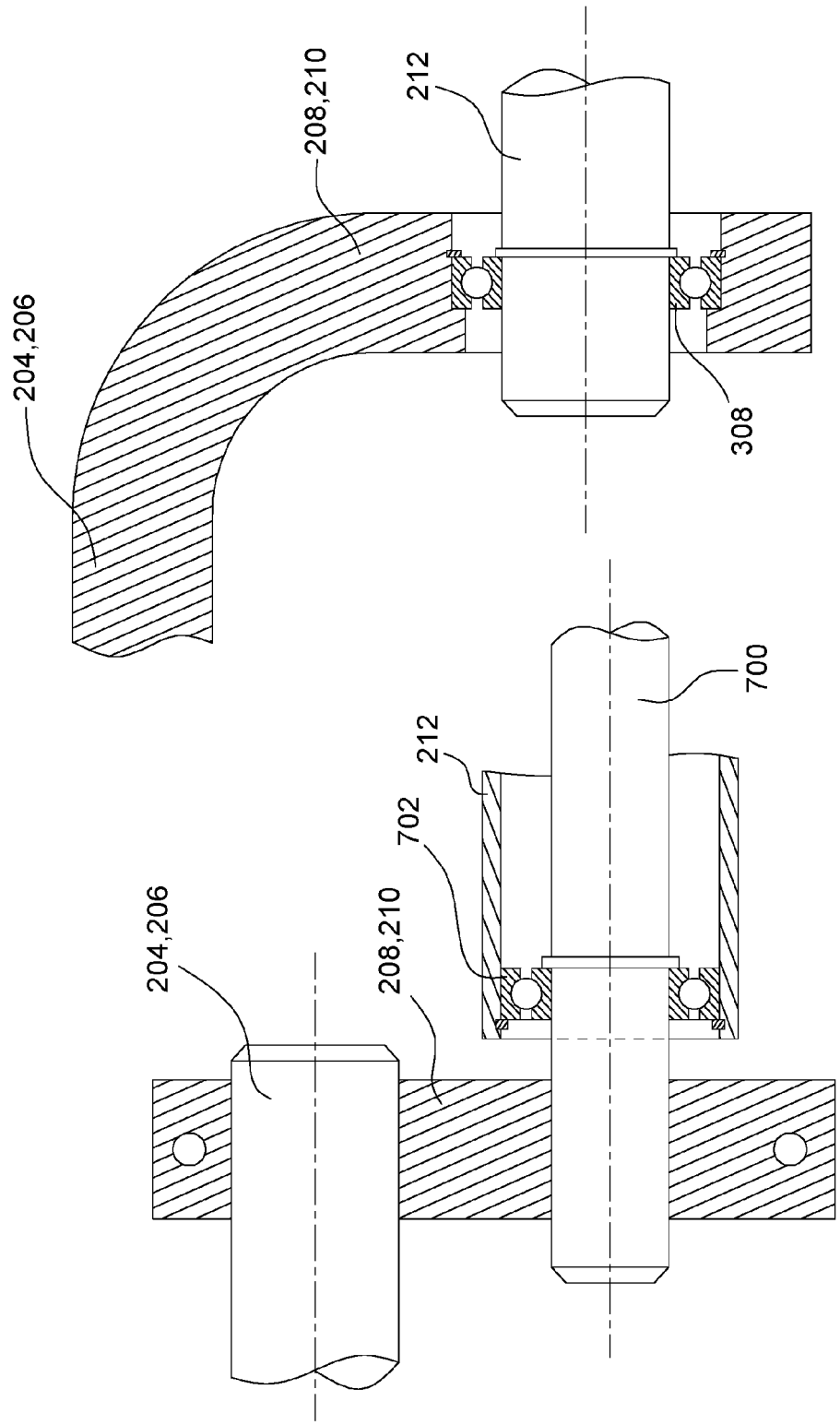

DRUM CONVEYOR

FIELD OF THE INVENTION

This invention relates generally to agricultural harvesting heads for agricultural combines. More particularly it relates to conveyors with fingers for agricultural harvesting heads.

BACKGROUND OF THE INVENTION

Many agricultural harvesting heads use drum conveyors that employ the retractable fingers extending to the wall of the drum to engage cut crop material and pull it underneath the drum. These drums may also be equipped with helical flutes to assist crop flow in a lateral direction.

Drum conveyors (sometimes called "feed drums", or "feed rollers") are driven in rotation at 200-300 RPM. Elongate fingers are rotatably mounted to a stationary shaft disposed inside the drum. These fingers extend through holes in the wall of the drum and are driven in rotation about the stationary shaft by the drum itself.

The fingers have one end that extends outside the drum and engages the crop, and a second end that is coupled to a bushing that wraps around the stationary shaft. As the drum is driven in rotation, the drum pushes on the side of the finger and causes it (and its bushing) to rotate around the shaft.

In recent years these bushings to which the fingers are attached have been made of thermoplastics such as nylon 66 or high molecular weight polyethylene (HMWPE). These plastic materials are less expensive to manufacture than metal bushings.

In US2011/0061354, for example, plastic is molded to form a plastic finger (1) with a metal core (9) with an integral a plastic bushing (7). Fourteen of these fingers are mounted for rotation on a stationary shaft (2). They rotate about this stationary shaft (2) at the same speed as the drum (not shown) through which they extend. The stationary shaft is rigidly clamped at its outer ends to two stub axles that are concentric with the drum itself. The stationary shaft is fixed in a position that is slightly offset from the rotational axis of the drum and of the two stub axles.

US2006/0252472 shows a similar arrangement in which a finger is pinned to a plastic bushing, (shown here as a hinged collar) that likewise rotates around an offset stationary shaft (38) that is clamped to stub axles at both ends.

Since the fingers are supported on the stationary shaft and extend through holes in the drum, every time the drum rotates, the bushings also rotate about the stationary shaft.

One problem with this arrangement is plastic bushing wear. This wear could be reduced by providing a ball or roller bearing instead of a bushing, but the cost would be prohibitive, given that drum conveyors on agricultural harvesting heads can have more than fifteen of these fingers.

What is needed therefore is a drum conveyor for an agricultural harvesting head with decreased finger wear. It is an object of this invention to provide such a drum conveyor.

SUMMARY OF THE INVENTION

In accordance with a first aspect of the invention, a drum conveyor for an agricultural harvesting head is provided comprising a laterally extending drum having a central rotational axis, a first end, and a second end; a first stub axle extending into the first end of the drum; a first link member having a rear end that is supported on the first stub axle and having a front end disposed forward from the first stub axle; a second stub axle extending into the second end of the drum; a second link member having a rear end that is supported on the second stub axle and having a front end disposed forward from the second stub axle; a third axle having a first end and a second end, the third axle is supported at its first end on the front end of the first link member for free rotation with respect to the first link member, and the third axle is supported at its second end on the front end of the second link member for free rotation with respect to the second link member.

The drum conveyor may further comprise an inner axle having a first end and a second end, the inner axle may be supported on the first link member at its first end, the inner axle may be supported on the second link member at its second end, and the third axle may be hollow and the inner axle may be disposed inside the third axle.

The third axle may be supported on a first bearing adjacent to its first end, and supported on a second bearing adjacent to its second end.

Each of the first stub axle and the first link member may be integrally formed with the other.

The first stub axle and the first link member may be removably fixed together.

The drum conveyor may further comprise a plurality of fingers, each of the plurality of fingers may further comprise a finger portion coupled to a bearing portion, the bearing portion may extend completely around the third axle, and the finger portion may extend through a corresponding aperture in an outer wall of the drum.

The bearing portion may be comprised of plastic and may have a cylindrical inner surface that abuts the third axle and may be supported for free rotation about the third axle.

The drum conveyor may further comprise a plurality of fingers that are supported for free rotation on the third axle, and friction between the plurality of fingers and the third axle may drive the third axle in rotation at the same speed that the drum rotates when the drum it is driven in rotation.

The friction exerted by the bearing portion of the plurality of fingers may be greater than the friction exerted on the third axle by the bearing.

The third axle may be supported for rotation on the first link member and the second link member about a longitudinal axis that is parallel to a longitudinal axis of rotation of the drum.

The axis of rotation of the third axle may be forward of the axle of rotation of the drum.

The second stub axle may be supported on the second link member by an axle bearing, and the axle bearing may permit free rotation of the second stub axle with respect to the second link member.

In accordance with a second aspect of the invention, and agricultural harvesting head may be provided comprising an elongate, laterally extending frame; a reciprocating knife extending across substantially the entire width of the laterally extending frame; a first conveyor mounted on the left side of the frame to convey the material to a central region of the agricultural harvesting head; a second conveyor mounted on the right side of the frame to convey the material to the central region of the agricultural harvesting head; a drum conveyor in accordance with the first aspect of the invention and configured to receive cut crop material from the first conveyor and the second conveyor and to convey that material to a feeder house that is configured to support the agricultural harvesting head on an agricultural combine.

BRIEF DESCRIPTION OF THE DRAWINGS

FIG. 7 is a top cutaway view of an alternative bearing arrangement and link member.

FIG. 8 is a top cutaway view of an alternative stub axle and link member.

DETAILED DESCRIPTION OF THE DRAWINGS

In the description herein, the term "forward" refers to a direction of travel of the agricultural harvester 100, and therefore the direction from which cut crop material is presented to the drum conveyor. "Reverse" or "rearward" refers to the opposite direction.

Figure 1:
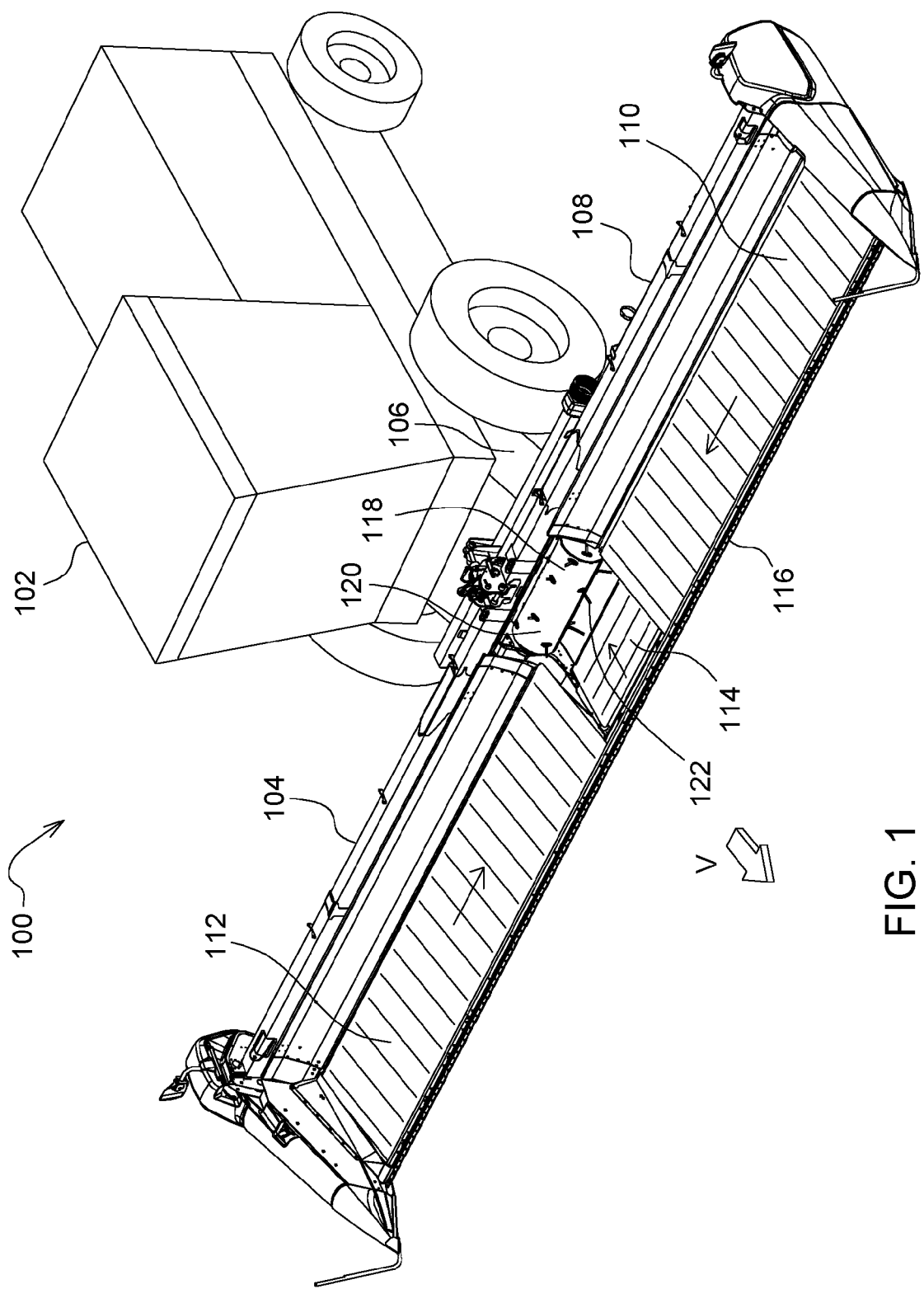
FIG. 1 is a perspective view of an agricultural harvester in accordance with the present invention.

In FIG. 1, an agricultural harvester 100 comprises a self-propelled agricultural combine 102 and an agricultural harvesting head 104 supported on the front of the agricultural combine 102. The agricultural harvesting head 104 is supported on a feeder house 106 which is supported on and extends forward from the front of the agricultural combine 102.

The agricultural harvesting head 104 includes a frame 108, which in turn supports a left side endless belt conveyor 110, a right side endless belt conveyor 112, and a center endless belt conveyor 114.

As the agricultural harvesting head 104 moves forward in a forward harvesting direction "V", the reciprocating knife 116 engages the stalks of plants and severs them. The severed crop material falls rearward onto the left side endless belt conveyor 110, the right side endless belt conveyor 112, and the center endless belt conveyor 114. The left side endless belt conveyor 110 conveys the cut crop material to the right toward a central region of the agricultural harvesting head 104. The right side endless belt conveyor 112 conveys the cut crop material to the left toward the central region of the agricultural harvesting head 104. The center endless belt conveyor 114 receives the cut crop material, and conveys it rearward.

A drum conveyor 118 engages the top of the mat of cut crop material that is traveling rearward on the center endless belt conveyor 114. The drum 120 of the drum conveyor 118 engages the top of the mat. Fingers 122 that extend from the drum 120 engage the top of the crop mat as well and pull the matter cut crop material downward and rearward.

Due to the internal construction of the drum conveyor 118 (described below), the fingers 122 retract into the drum 120 as they rotate with the drum 120. By the time the fingers 122 reach the rear side of the drum 120, they are retracted almost entirely within the body of the drum, thereby releasing the cut crop mat so it can be conveyed rearward into the feeder house one.

The agricultural harvesting head 104 is removably supported on the feeder house one as the agricultural harvester 100 travels through the field harvesting crop. The feeder house 106 includes a chain or belt conveyor that receives the cut crop material from the drum conveyor and lifts it upward, through the feeder house, and to a cut crop entrance of the agricultural combine 102.

Figure 2:
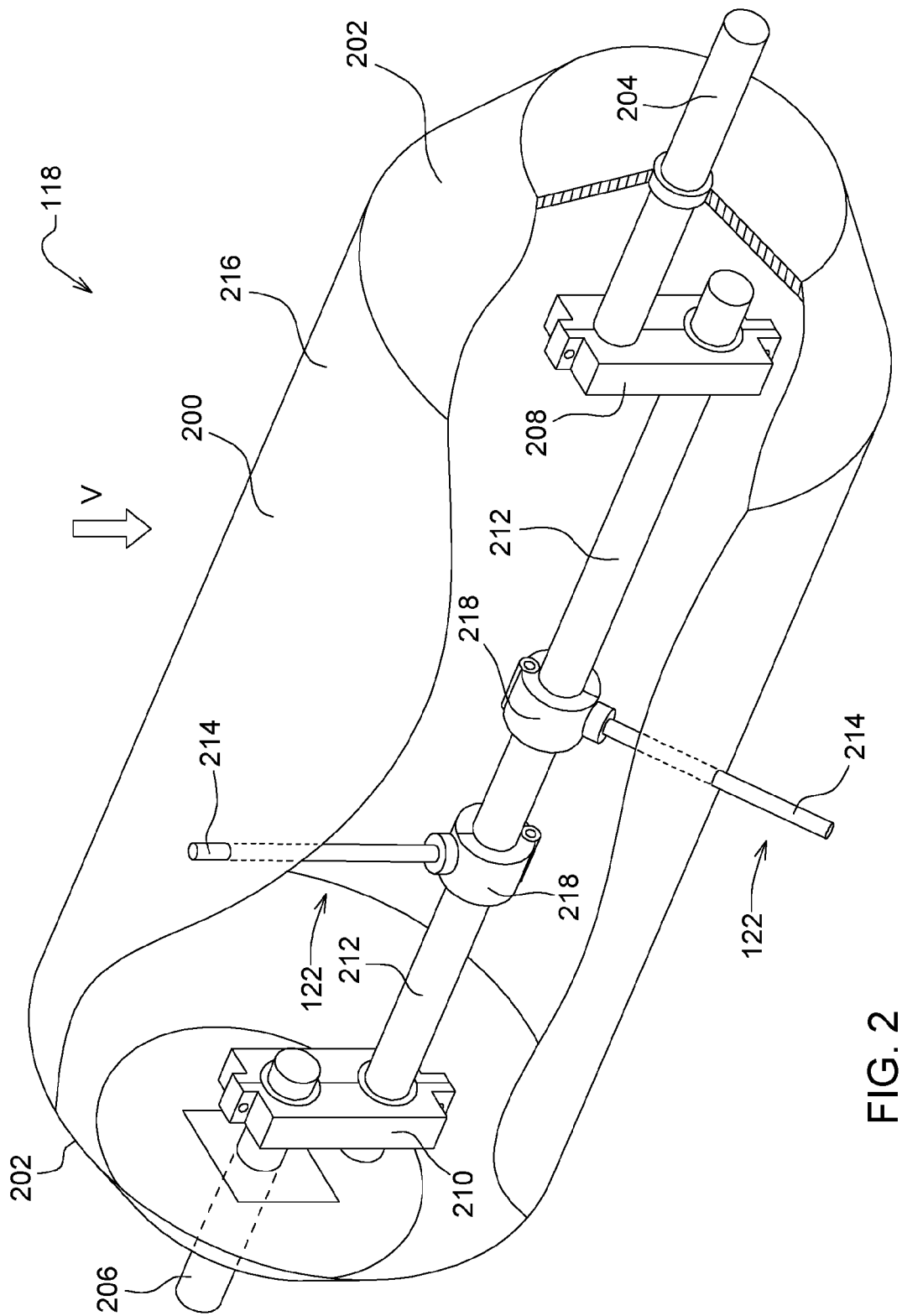
FIG. 2 is a perspective partial phantom view of the drum conveyor of FIG. 1.

In FIG. 2, the drum 120 comprises a center section 200 that is in the form of a right circular thin-walled cylindrical tube. A frustoconical section 202 having a thin wall is welded to each end of the center section 200. The drum, thus constructed forms what appears to be a right circular cylinder that is chamfered at both ends.

The left end of the drum conveyor is supported on a stub axle 204. The right end of the drum conveyor is supported on the stub axle 206. The drum 120 is coaxial with the stub axles 204, 206. The drum 120 is driven in rotation about the longitudinal axis of stub axles 204, 206 and the drum 120 by a motor (not shown).

Link members 208, 210 are fixed to the ends of the stub axle 204, 206, respectively, inside the drum 120. Link members 208, 210 extend in a direction generally forward of the stub axles 204, 206.

An axle 212 has two opposing ends and is fixed to the forward ends of link members 208, 210. The axle 212 is supported on bearings for free rotation with respect to link members 208, 210. Fingers 122 are mounted on axle 212 for free rotation with respect to the axle 212. Fingers 122 comprise a finger portion 214 that extends through the wall 216 of the drum 120 and a bearing portion 218 that extends about and is supported on the axle 212. The bearing portion 218 is preferably a bushing, and more preferably plastic. Examples of fingers 122 can be found in US2011/0061354 A1 and US2006/0252472 A1, both of which are incorporated herein for reference for all that they teach. The bearing portion 218 is configured to provide free rotation of the fingers 122 about axle 212.

In the embodiment shown herein, only two fingers 122 are illustrated. This is for convenience only. A typical drum conveyor in accordance with the present invention would have 10 to 20 fingers 122 supported on axle 212 in adjacent and abutting positions as shown for example, in US2011/0061354 A1.

Figure 3:
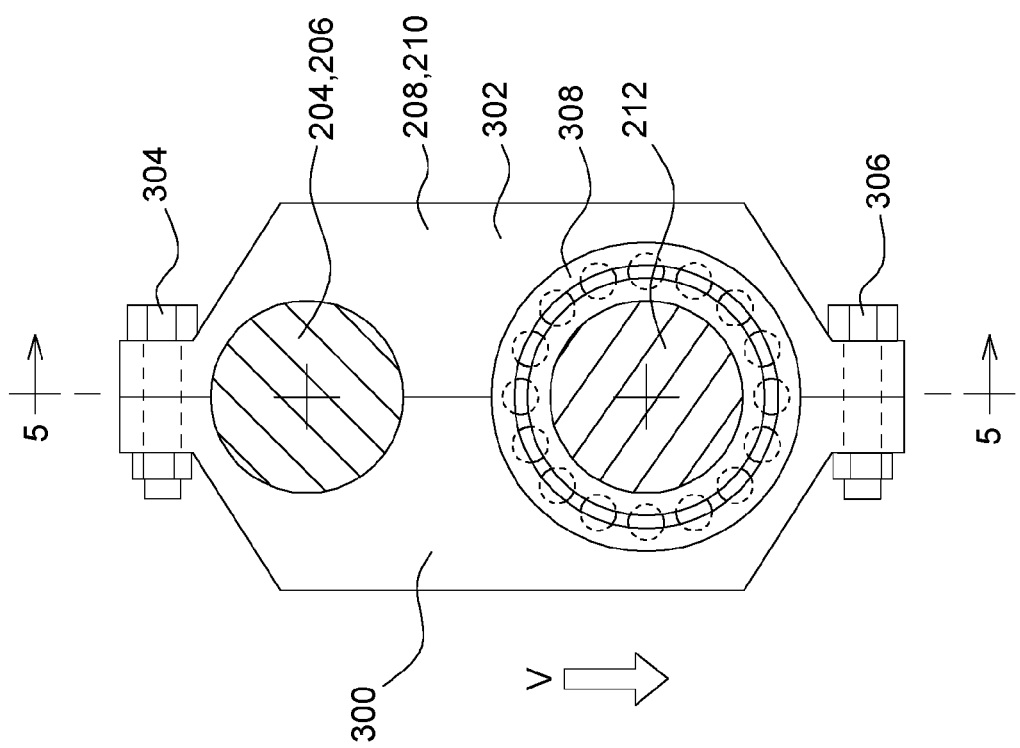
FIG. 3 is a side view of a first link member used on either the left or right ends of the conveyor of FIGS. 1 and 2.
Figure 6:
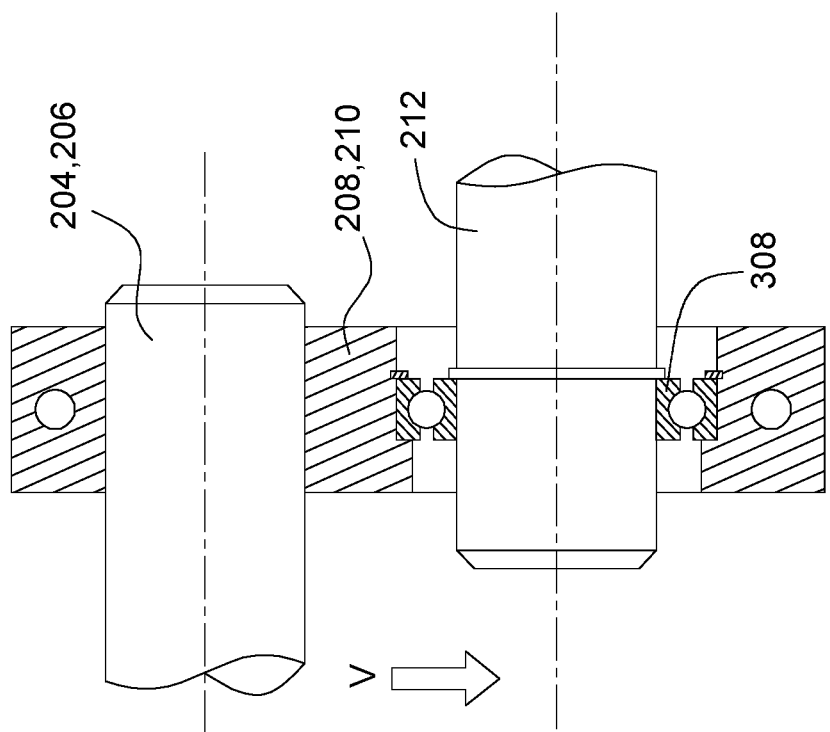
FIG. 6 is a top cutaway view of the link member of FIG. 3 taken at section line 5-5 of FIG. 3 and showing an alternative (single) bearing arrangement.
Figure 5:
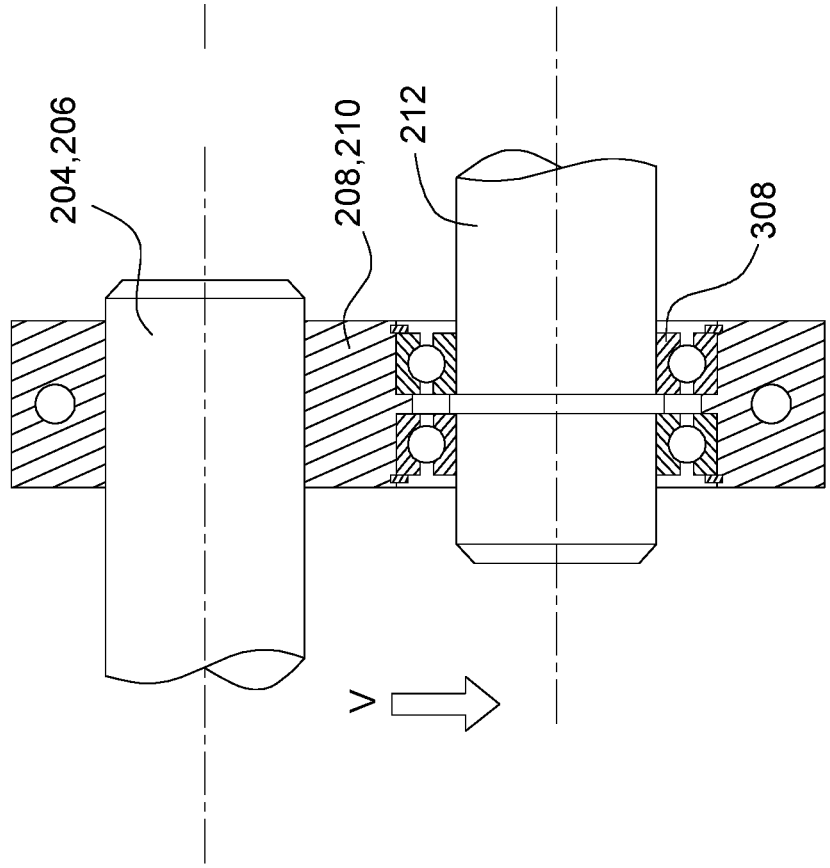
FIG. 5 is a top cutaway view of the link member of FIG. 3 taken at section line 5-5 of FIG. 3.

FIGS. 3 and 5 show a first configuration of link members 208, 210. In this configuration, link members 208, 210 are formed of two similar half-members 300, 302 that are bolted together with two bolts 304, 306. These bolts pass through holes in halves 300, 302 and clamp the two halves 300, 302 together. When clamped together, link members 208, 210 define a first aperture that receives and is fixed to stub axle 204, 206. The link members 208, 210 also define a second aperture that is axially offset from but parallel to the first aperture. The second aperture is fixed to a bearing 308. A bearing 308 may be a bushing, or a rolling element bearing (such as a ball bearing or roller bearing), as illustrated in FIGS. 3 and 5. The inner race of bearing 308 is fixed to axle 212. Bearing 308 permits axle 212 to rotate freely with respect to stub axle 204, 206 and link member 208, 210.

Bearing 308 may comprise two bearings in a side-by-side relationship (as shown in FIG. 5), or it may comprise a single bearing as shown in FIG. 5.

In another arrangement shown in FIG. 7, the link members 208, 210 when clamped are fixed to stub axles 204, 206 and to an inner axle 700. The inner axle 700 extends between and is fixed to stub axles 204, 206 at both ends of the inner axle 700. The axle 212 is supported on the inner axle 700 for free rotation by bearing 702. Thus supported on two bearings 702 at each end, the axle 212 can rotate freely with respect to the inner axle 700, and the link members 208, 210.

In another arrangement shown in FIG. 8, the stub axle 204, 206 can be formed integral with the link member 208, 210. This integral stub axle+link member can be formed by welding or casting followed by subsequent machining to ensure that the axis of rotation of the stub axle 204, 206 and the axis of rotation of the axle 212 are generally parallel and spaced apart the proper distance.

Figure 4:
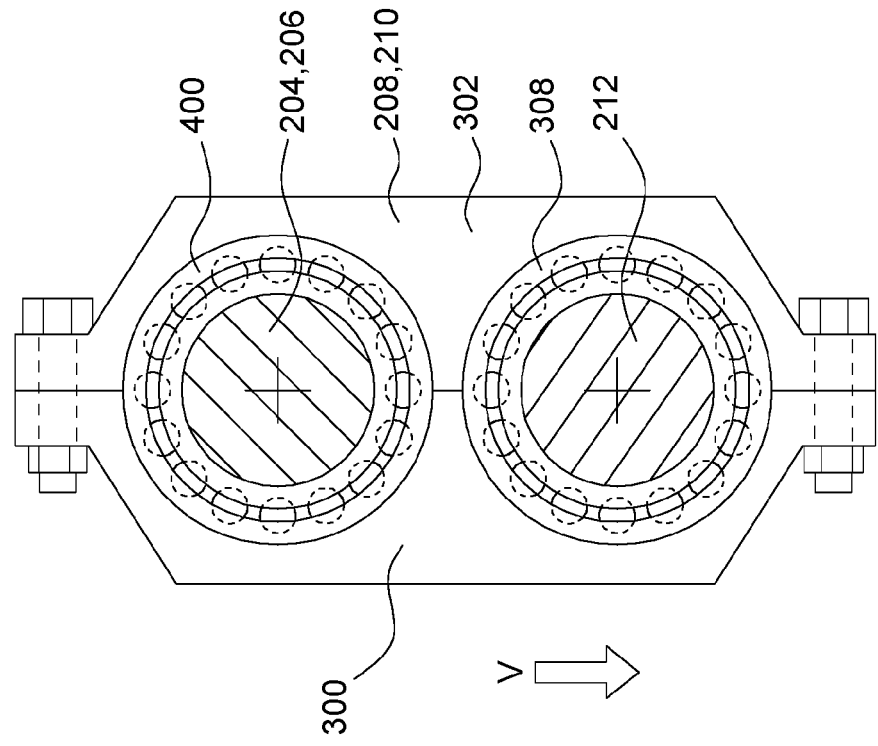
FIG. 4 is a side view of the second link and alternatively member used on your the left or right ends of the conveyor of FIGS. 1-2.

Referring to FIG. 4, one or the other of the link members 208, 210, may comprise an additional bearing 400 that is coaxial with stub axle 204, 206 and supports stub axle 204, 206 for free rotation with respect to the link member 208, 210. This is beneficial when one of the stub axles 204, 206 is fixed to one end of the drum 120 and drives drum 120 in rotation about its longitudinal central axis. By providing the additional bearing 400, the stub axle that is fixed to the drum 120 can rotate to drive the drum 120 in rotation, while supporting its associated link member 208, 210 within the drum. Both stub axles 204, 206, however, cannot be provided with the additional bearing 400. If both stub axles 204, 206 were provided with the additional bearing 400, the link members 208, 210 could no longer be fixed in a stationary position within the drum 120. This fixed position within the drum is necessary to ensure that the fingers 122 extend and retract within the drum 120 at the appropriate rotational positions of the drum 120. Generally speaking, the link members 208, 210 support axle 212 for free rotation about its longitudinal axis in a position offset forward of the longitudinal axis defined by the stub axles 204, 206.

The bearings 308, 702 that support the axle 212 at each end for free rotation with respect to the link members 208, 210 are selected such that their combined rotating friction is less than the combined rotating friction of all of the fingers 122 that are mounted for free rotation on the on the axle 212. When this relative friction is achieved, the axle 212 will rotate together with the drum and with the fingers. Thus, as the fingers rotate, the axle 212 will rotate at the same speed as the fingers rotate, and since the fingers 122 are driven by the drum 120, all three (i.e. fingers 122, drum 120, and axle 212) will rotate at the same speed while the link members 208, 210 will remain stationary. The stub axles shown in FIGS. 3, 5, 6, 7, and 8 will also remain stationary. Since the stub axle of FIG. 4 represents an embodiment in which the stub axle is coupled to the drum and drives the drum, it will always rotate together with the drum.

The effect of selecting relative bearing friction in this manner is that the relative speed of the bearing portions 218 with respect to the axle 212 will be zero. The bearing portions 218 may advance or retard slightly (i.e. less than 45°, more preferably less than 30°, even more preferably less than 15°) with respect to axle 212 as the drum 120 goes through a single revolution. This relative angular movement of the bearing portions 218 with respect to the axle 212 using the invention herein is significantly less than the 360° of bearing portion 218 rotation about the fixed, nonrotating axles 212 of the prior art. As a result, the bearing portions 218 of the present invention wear considerably less than the bearing portions 218 of the prior art.

The invention (or inventions) described herein is not limited to the particular embodiments disclosed above and in the associated figures. The invention (or inventions) is defined by the claims. The embodiments disclosed herein merely illustrate at least one working example of the invention. Other embodiments of the invention are also possible. Other arrangements of the invention are possible.

We claim:

1. A drum conveyor for an agricultural harvesting head comprising:
    a laterally extending drum having a central rotational axis, a first end, and a second end,
    a first stub axle extending into the first end of the drum and supporting the drum for rotation;
    a first link member having a rear end that is supported on the first stub axle and having a front end offset forwardly from the first stub axle;
    a second stub axle extending into the second end of the drum and supporting the drum for rotation;
    a second link member having a rear end that is supported on the second stub axle and having a front end offset forward from the second stub axle;
    a third axle having a first end and a second end, wherein the third axle is supported at its first end on the front end of the first link member for free rotation with respect to the first link member, and wherein the third axle is supported at its second end on the front end of the second link member for free rotation with respect to the second link member.

2. The drum conveyor of claim 1, further comprising an inner axle having a first end and a second end, wherein the inner axle is supported on the first link member at its first end, wherein the inner axle is supported on the second link member at its second end, and wherein the third axle is hollow and wherein the inner axle and is disposed inside the third axle.

3. The drum conveyor of claim 1, wherein the third axle is supported on a first bearing adjacent to its first end, and a second bearing adjacent to its second end.

4. The drum conveyor of claim 1, wherein each of the first stub axle and the first link member are integrally formed with the other.

5. The drum conveyor of claim 1, wherein the first stub axle and the first link member are removably fixed together.

6. The drum conveyor of claim 1, further comprising a plurality of fingers, wherein each of the plurality of fingers further comprises a finger portion coupled to a bearing portion, wherein the bearing portion extends completely around the third axle, and wherein the finger portion extends through a corresponding aperture in an outer wall of the drum.

7. The drum conveyor of claim 6, wherein the bearing portion is comprised of plastic and has a cylindrical inner surface that abuts the third axle and is supported for free rotation about the third axle.

8. The drum conveyor of claim 1, further comprising a plurality of fingers that are supported for free rotation on the third axle, and further wherein friction between the plurality of fingers and the third axle drive the third axle in rotation at the same speed that the drum rotates when the drum it is driven in rotation.

9. The drum conveyor of claim 6, wherein friction exerted by the bearing portion of the plurality of fingers is greater than the friction exerted on the third axle by the bearing.

10. The drum conveyor of claim 1, wherein the third axle is supported for rotation on the first link member and the second link member about a longitudinal axis of rotation that is parallel to a longitudinal axis of rotation of the drum.

11. The drum conveyor of claim 10, wherein the longitudinal axis of rotation of the third axle is forward of the longitudinal axis of rotation of the drum.

12. The drum conveyor of claim 1, wherein the second stub axle is supported on the second link member by an axle bearing, and wherein the axle bearing permits free rotation of the second stub axle with respect to the second link member.

13. An agricultural harvesting head comprising:
    an elongate, laterally extending frame;

a reciprocating knife extending across substantially an entire width of the laterally extending frame;

a first conveyor mounted on the left side of the frame to convey the cut crop material to a central region of the agricultural harvesting head;

a second conveyor mounted on the right side of the frame to convey to the central region of the agricultural harvesting head;

a drum conveyor in accordance with claim 1 and configured to receive cut crop material from the first conveyor and the second conveyor and to convey that material to a feeder house that is configured to support the agricultural harvesting head on an agricultural combine.

14. The drum conveyor of claim 1, wherein the third axle comprise a single continuous shaft extending from the first link member to the second link member.

15. The drum conveyor of claim 1 comprising a plurality of axially spaced fingers radially extending from the third axle.

16. The drum conveyor of claim 1, wherein the third axle extends through the first link member and through the second link member.

17. The drum conveyor of claim 1, wherein the third axle comprise a single continuous tube having a first bearing at the first end and adjacent the first link member and a second bearing at the second end and adjacent the second link member.

18. The drum conveyor of claim 17 further comprising a plurality of axially spaced fingers radially extending from the tube.

19. The drum conveyor of claim 1 further comprising:

first bearings rotatably supporting the third axle for rotation respect to the first link member and the second link member; and a plurality of fingers rotatably supported about the third axle by second bearings, wherein a combined rotating friction of the first bearings is less than a combined rotating friction of the second bearings.

20. The drum conveyor of claim 1 further comprising:

first bearings rotatably supporting the third axle for rotation respect to the first link member and the second link member; and a plurality of fingers rotatably supported about the third axle by second bearings, wherein a combined rotational friction of the first bearings relative to a combined rotational friction of the second bearings is such that the second bearings rotate less than 45° with respect to the third axle during a single revolution of the drum.

\* \* \* \* \*